Figure 1:
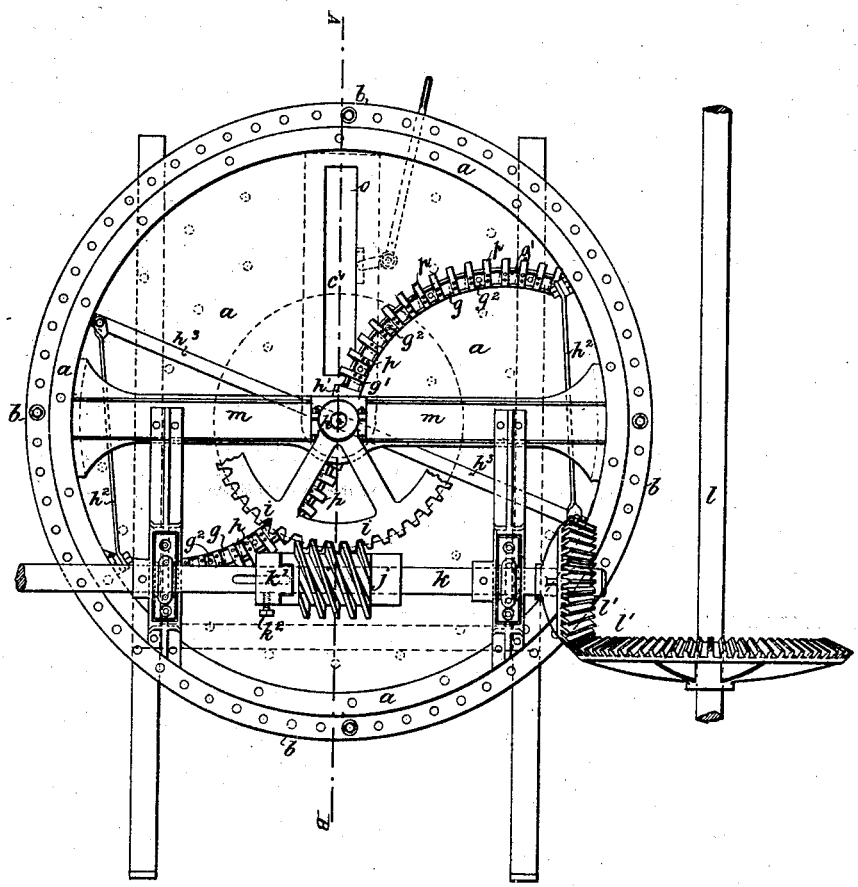

(No Model.)  5 Sheets—Sheet 1.

J. F. JOHNSTONE.
OFFAL DRIER.

No. 285,135. Patented Sept. 18, 1883.

*Fig: 1*

Witnesses
James Young.
Eugene V. Brown.

Inventor.
Jno. F. Johnstone
By attys
Baldwin, Hopkins & Peyton (No Model.)

J. F. JOHNSTONE.
OFFAL DRIER.

No. 285,135.

5 Sheets—Sheet 2.

Patented Sept. 18, 1883.

Witnesses.
James Young.
Eugene V. Brown.

Inventor.
Jno. F. Johnstone
By Attys
Baldwin, Hopkins & Peyton (No Model.)

J. F. JOHNSTONE.
OFFAL DRIER.

No. 285,135.  Patented Sept. 18, 1883.

5 Sheets—Sheet 4.

Fig:4.

Witnesses
James Young.
Eugene V. Brown,

Inventor.
Jno. F. Johnstone,
By Attys.
Baldwin, Hopkins & Peyton.

(No Model.) 5 Sheets—Sheet 5.
J. F. JOHNSTONE.
OFFAL DRIER.
No. 285,135. Patented Sept. 18, 1883.
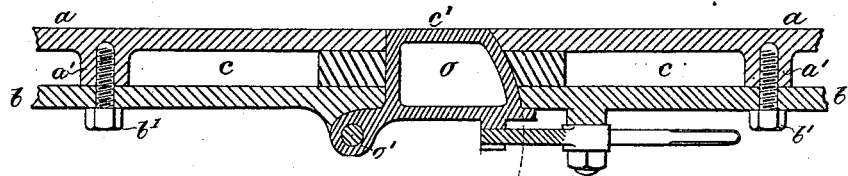
Fig. 5.
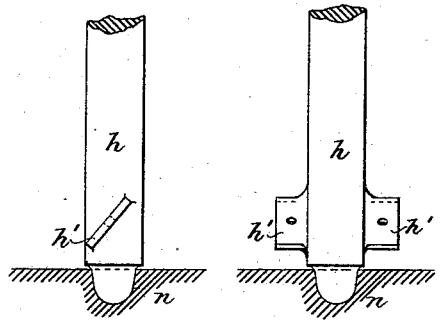
Fig. 6.   Fig. 7.
Fig. 11.
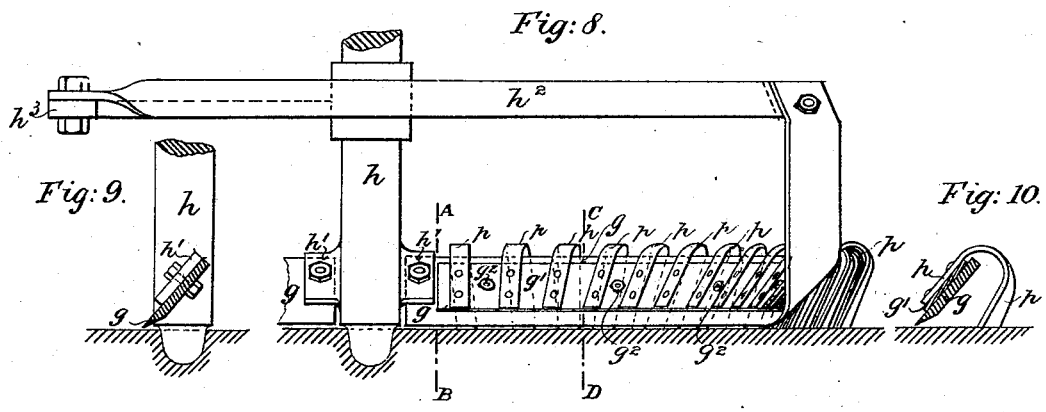
Fig. 8.
Fig. 9.   Fig. 10.
Witnesses
James Young.
Eugene V. Brown.
Inventor
Jno. F. Johnstone,
By attys
Baldwin, Hopkins & Peyton.

UNITED STATES PATENT OFFICE.

JOHN F. JOHNSTONE, OF BROOKSBY CHEMICAL WORKS, BOW COMMON LANE, COUNTY OF MIDDLESEX, ENGLAND.

OFFAL-DRIER.

SPECIFICATION forming part of Letters Patent No. 285,135, dated September 18, 1883.

Application filed June 4, 1883. (No model.) Patented in England September 4, 1882, No. 4,203.

*To all whom it may concern:*

Be it known that I, JOHN FORSYTH JOHNSTONE, a subject of the Queen of Great Britain, residing at Brooksby Chemical Works, Bow Common Lane, in the county of Middlesex, England, chemical and manure manufacturer, have invented certain new and useful Improvements in Drying Apparatus, applicable especially for drying all kinds of waste animal, fish, or other matter, (for which I have received Letters Patent in Great Britain, No. 4,203, dated September 4, 1882; but a French patent was applied for on 9th April last,) of which the following is a specification.

The object of my invention is mainly to construct drying apparatus in such a manner that waste animal, fish, or other matter can be dried without allowing any noxious vapors to escape into the outside atmosphere, and at a much less cost than has hitherto been done. The apparatus is, however, applicable for drying a great variety of other substances. The apparatus consists of a shallow pan, made of iron, steel, or other metal, having around its lower part a jacket for holding high-pressure steam or other heating medium. The top of the pan is closed by covering-plates, through which is an opening at which the material to be operated upon may be placed in the pan. An outlet-pipe is also led away from the top of the pan for conveying away vapors. The waste material is kept in motion during the drying process by agitators fixed to a central upright shaft. Each agitator is formed of a curved metal blade extending horizontally from the shaft, with its lower edge as near as possible to the bottom of the pan. A series of curved flat-bladed springs are also secured to the agitators. Their ends scrape the bottom of the pan just in rear of the agitators, and by them the whole bottom surface of the pan is continuously scraped over. From the bottom of the pan is also an outlet-passage carried downward through the steam-jacket. While the apparatus is in operation this passage is closed by a door the top of which comes on a level with the surface of the bottom of the pan. When the material has been dried, the door is opened and the dried material is allowed to pass out through the outlet-passage.

The drawings annexed show a machine constructed according to my invention.

Figure 2:
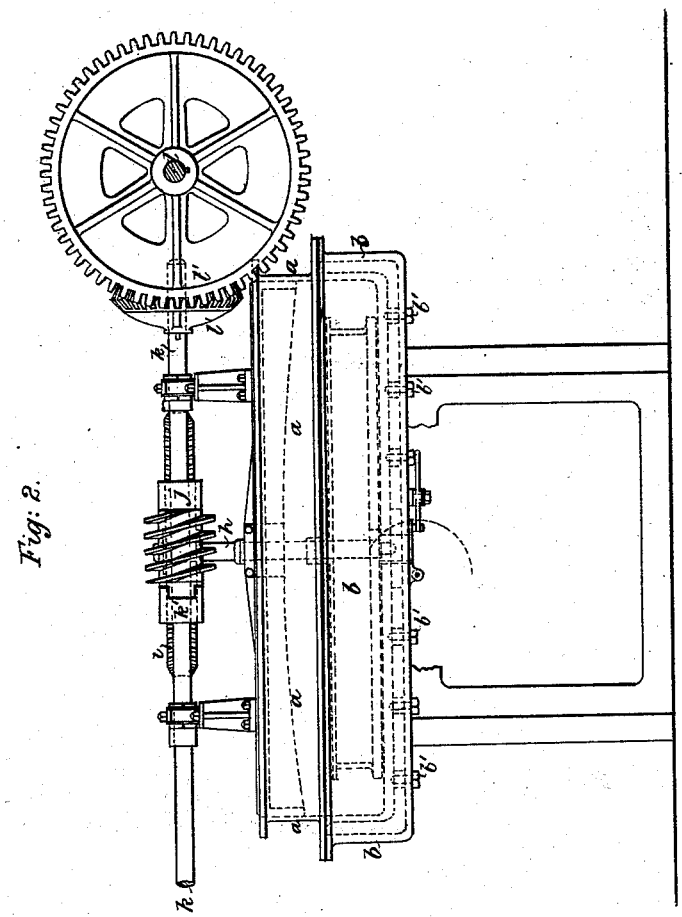
Figure 3:
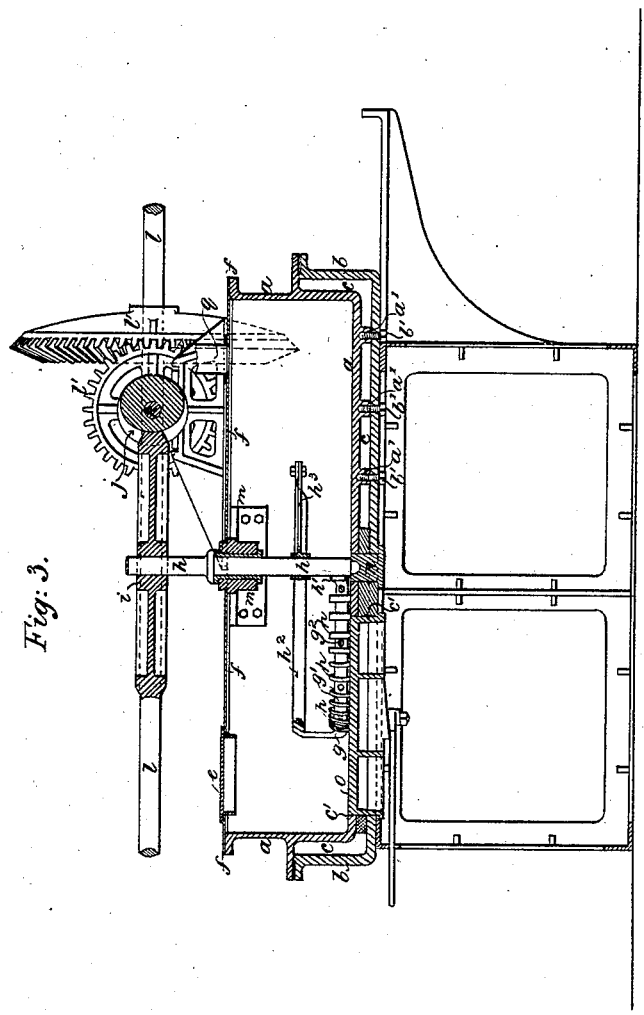
Figure 4:
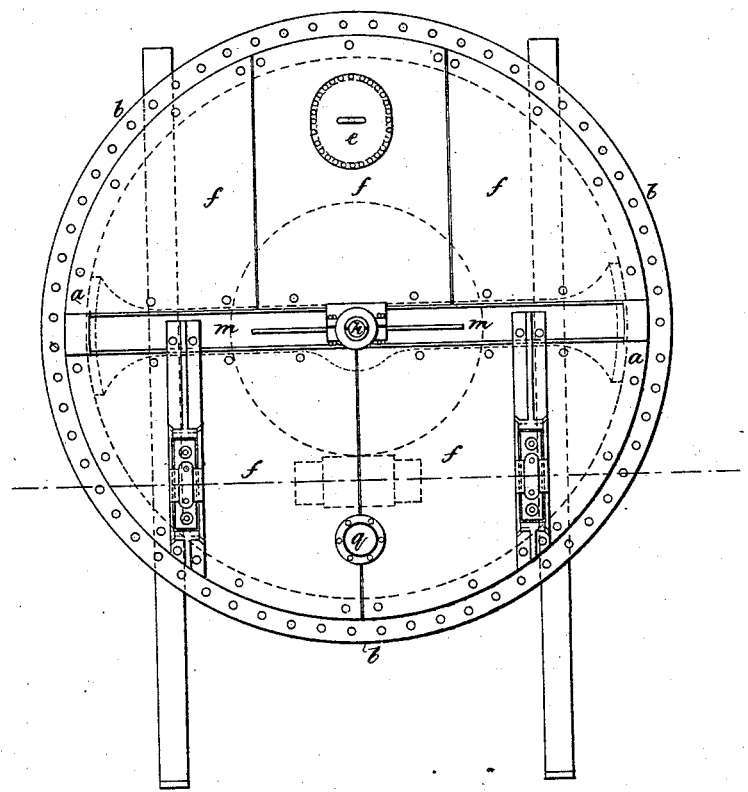

Figure 1 is a plan of the machine with the cover-plates removed, and also part of the wheel by which the axis of the agitator is revolved. Fig. 2 is a side elevation of the machine. Fig. 3 is a section on the line A B in Fig. 1. Fig. 4 is a plan, showing the covers, but with the driving-gear removed. Fig. 5 is a cross-section on a larger scale, taken through that part of the bottom of the pan at which the outlet-door is situated. Figs. 6 and 7 show two elevations, taken at right angles to one another, of the lower part of the agitator-axis. Fig. 8 shows in elevation the lower part of the agitator-axis and one of the agitators. Fig. 9 is a cross-section of the agitator, taken on the line A B, Fig. 8; and Fig. 10 is a cross-section of the agitator, taken on the line C D, Fig. 8. Fig. 11 is a cross-section of the covering-plates by which the pan is closed over.

$a\,a\,a$ is a circular pan with a flange extending outward all around it. The flange rests upon the top of another flange-pan, $b\,b\,b$, which is of a larger diameter. (See Figs. 2 and 3.) Both pans I make by preference of cast-iron. The inner pan does not extend to the bottom of the outer pan, so that a space, $c$, is left between the two pans around the sides and at the bottom. This space forms a steam-jacket to which steam at high pressure, superheated steam, or other heating medium—such as hot air—is supplied for the purpose of heating the inner pan and drying any material which may be placed in it. The steam or other heating medium may be supplied through a pipe connected to any convenient part of the bottom of the pan $b$. On the under side of the bottom of the pan $a$ are projections $a'$, to rest on the bottom of the larger pan $b$, and bolts $b'$ are passed through the bottom of the pan $b$ into these projections, so as to bolt together the bottoms of the two pans and allow of steam at a pressure of, say, sixty to eighty pounds to the inch being supplied to the space between them. The top of the pan $a$ is closed over by covering-plates $f$. The edges of the plates are bolted down to the top flange of the pan $a$ and to a strong girder, $m$, which is fixed across the top of the pan. Where the plates abut one against the other, the aperture between them is covered by a bar secured to the under side of one of the plates; or the side edges of the plates may be made to overlap one another in the manner shown at Fig. 11. In this way the pan is closed over in an air-tight manner, or nearly so.

The substance to be dried is fed into the inner pan, $a$, through an opening, $e$, in one of the top covering-plates, $f$. (See Figs. 3 and 4.) This opening is, as shown, provided with a suitable cover, by which it can be closed during the drying operation.

$g$ are the agitators, shown in Figs. 1, 2, and 3. They extend horizontally from a vertical axis, $h$, to which a slow revolving motion is imparted. The agitators just clear the side and bottom of the pan. They are formed of a metal plate curved in the manner shown at Fig. 1, and fixed at one end to a lug or projection, $h'$, which stands out from the axis $h$, while the opposite end is bent upward at right angles, and is at its extremity bolted to one end of a connecting-rod, $h^2$, which rod, at its other end, is fixed to the extremity of a radial arm, $h^3$, which stands out from the axis, as seen in Figs. 1 and 8. The connecting-rod serves to drag round the outer end of the agitator whenever the axis is revolved. The lugs $h'$ and agitator-blade $g$ are, as shown, inclined at an angle to the bottom of the pan. The material scraped up in front of the agitator escapes backward over its upper edge, and so, after being lifted by the agitator, drops down behind it. The agitators also carry a series of curved flat-bladed springs, $p$ $p$ $p$ $p$. (See Figs. 1, 3, 8, 9, and 10.) The springs are riveted to a bar, $g'$, which is itself bolted to the agitator-blade by bolts $g^2$. The springs form a series of scrapers which scrape over the whole of the bottom of the pan, that portion of the bottom of the pan not scraped over by the scrapers carried by one agitator-blade being scraped over by the scrapers carried by the other agitator-blade. Each spring-scraper is also somewhat twisted, so that its scraping-edge is not radial to the axis, but is somewhat inclined to a radial line, in order that the matter scraped up by it may be moved inward toward the axis and pass through the spaces between the scrapers, instead of being carried forward in front of them. When the scrapers become worn or unserviceable, the bolts $g^2$ are unscrewed. The bar $g'$ can then be taken off and another one similarly carrying a set of spring-scrapers be put on instead of it.

The vertical spindle $h$ in Figs. 1, 2, 3 is driven by a worm-wheel, $i$. (Seen in Figs. 1, 2, 3.) This is firmly fixed on the vertical spindle $h$, and engages a worm, $j$, on the horizontal shaft $k$. (See Figs. 1, 2, 3.) The vertical spindle $h$ works in a bearing carried by the strong girder $m$, fixed across the top of the pan $a$, and at the bottom of the pan the spindle takes its bearing in a step, $n$, or otherwise. The worm $j$ is free to turn on the horizontal shaft $k$, but can be locked to it by a clutch, $k'$, which can be slid endwise along the shaft, and when moved into position to lock the worm to the shaft can be secured to the shaft by a locking screw-bolt, $k^2$.

When the matter in any one machine has been dried to a proper condition, it is let out from the machine through a door or trap, $o$, at the bottom of the under pan, $b$ $b$ $b$. This door, as will be seen at Figs. 1 and 2, is made to open downward on a hinge-joint, $o'$. When the door is closed, it fills up a passage, $c'$, formed through the steam-space $c$, and its top comes level with the bottom of the pan $a$. The steam evaporated from the material during the process of drying is led off or exhausted out of the machine through a pipe, $q$, secured to an opening in the cover, and, if necessary, may be condensed or otherwise rendered innocuous.

Having thus described the nature of my invention and the manner of performing the same, I would have it understood that I claim—

1. The combination of the pan $a$, steam-jacket $c$, surrounding the sides and bottom of pan-passage $c'$, leading through steam-jacket $c$, door $o$, for closing this passage, cover-plates $f$, axis $h$, and agitators $g$, carrying spring-scrapers $p$, substantially as described.

2. The combination of the pan $a$, surrounding pan $b$, distance-pieces $a'$, bolts $b'$, passage $c'$, leading down through steam-space $c$, door $o$, for closing this passage, cover-plates $f$, for closing over the top of pan $a$, exhaust or outlet passage $q$, axis $h$, and agitators $g$, carrying spring-scrapers $p$, substantially as described.

3. The combination of the pan $a$, the surrounding pan $b$, the distance-pieces $a'$, bolts $b'$, passage $c'$, door $o$, cover-plates $f$, outlet-passage $c'$, axis $h$, and agitators $g$, substantially as described.

JOHN FORSYTH JOHNSTONE.

Witnesses:
 JNO. DEAN,
 T. J. OSMAN,
*Both of 17 Gracechurch Street, London.*